United States Patent
Rai et al.

(10) Patent No.: US 9,830,230 B1
(45) Date of Patent: Nov. 28, 2017

(54) SYSTEMS AND METHODS FOR STORING UPDATED STORAGE STACK SUMMARIES

(71) Applicant: Veritas Technologies LLC, Mountain View, CA (US)

(72) Inventors: Braj Shyam Rai, Pune (IN); Niteen Kulkarni, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 517 days.

(21) Appl. No.: 14/460,802

(22) Filed: Aug. 15, 2014

(51) Int. Cl.
G06F 17/30 (2006.01)
G06F 11/14 (2006.01)

(52) U.S. Cl.
CPC .... G06F 11/1458 (2013.01); G06F 17/30091 (2013.01)

(58) Field of Classification Search
CPC .................. G06F 17/30091; G06F 11/1458
See application file for complete search history.

(56) References Cited

U.S. PATENT DOCUMENTS

| 7,191,225 | B1* | 3/2007 | Borthakur | G06F 17/30067 |
| | | | | 707/999.008 |
| 7,774,391 | B1* | 8/2010 | Le | G06F 17/30091 |
| | | | | 707/822 |
| 8,832,027 | B1* | 9/2014 | Bushman | 707/639 |
| 2010/0125588 | A1* | 5/2010 | Mehra | G06F 17/30088 |
| | | | | 707/754 |
| 2010/0125705 | A1* | 5/2010 | Mehra | G06F 3/0608 |
| | | | | 711/114 |
| 2010/0125714 | A1* | 5/2010 | Mehra | G06F 3/0607 |
| | | | | 711/166 |
| 2014/0074782 | A1* | 3/2014 | Green | G06F 3/061 |
| | | | | 707/620 |
| 2015/0339180 | A1* | 11/2015 | Shih | G06F 11/0793 |
| | | | | 714/49 |

OTHER PUBLICATIONS

Alain Azagury et al., "Point-In-Time Copy: Yesterday, Today, and Tomorrow", 2002, pp. 259-270.*
Xianbo Zhang, et al.; Systems and Methods for Prefetching Subsequent Data Segments; U.S. Appl. No. 13/961,685, filed Aug. 7, 2013.
Su, Edison, "Introduction to CloudStack Storage Subsystem", http://www.slideshare.net/buildacloud/1-cloudstack-storage-subsystem, as accessed Jun. 17, 2014, (May 2, 2013).
Rouse, Margaret, "Storage snapshot", http://searchstorage.techtarget.com/definition/storage-snapshot, as accessed Jun. 17, 2014, (Mar. 8, 2011).
"List of file systems", http://en.wikipedia.org/wiki/List_of_file_systems, as accessed Jun. 17, 2014, Wikipedia, (Sep. 5, 2004).

* cited by examiner

Primary Examiner — Apu Mofiz
Assistant Examiner — Jared Bibbee
(74) Attorney, Agent, or Firm — FisherBroyles LLP

(57) ABSTRACT

The disclosed computer-implemented method for storing updated storage stack summaries may include (1) analyzing a storage stack to determine a structure of the storage stack, (2) storing a summary of the structure of the storage stack to a database, (3) intercepting a command directed to the storage stack that causes a change to the structure of the storage stack, and (4) updating only that portion of the summary of the structure in the database that is affected by the change to the structure of the storage stack instead of updating the entire summary. Various other methods, systems, and computer-readable media are also disclosed.

17 Claims, 7 Drawing Sheets

SYSTEMS AND METHODS FOR STORING UPDATED STORAGE STACK SUMMARIES

BACKGROUND

In an era of constant connectivity, an inability to efficiently create and maintain backups of important data can be a severe liability. Computing devices are prone to a wide variety of both temporary and fatal errors, and even temporary losses of data or services may be devastating to enterprises. The ability to quickly recover systems from a backup is crucial to enterprises that wish to maintain consistent services. Also important is the ability to quickly create and copy backups. A backup that requires substantial time to create is less likely to be frequently updated, leading to potential data losses if a failure occurs between backups, while a backup that is not replicated may itself be lost. More efficient backup creation may lead to a larger number of current copies of an organization's data, decreasing the chances that key data will be lost. Many organizations store important data in storage stacks and consequently devote significant resources to maintaining storage stack backups.

Storing data to a storage stack backup may require knowledge of the structure of the storage stack. Recovering data from a storage stack backup may also involve using information about the storage stack structure. Traditional systems for creating backups of storage stacks may determine a storage stack's structure by running a discovery operation on the entirety of the storage stack as part of every backup operation. Unfortunately, such discovery operations may be time and/or resource intensive. Accordingly, the instant disclosure identifies and addresses a need for additional and improved systems and methods for storing updated storage stack summaries.

SUMMARY

As will be described in greater detail below, the instant disclosure describes various systems and methods for storing updated storage stack summaries by creating a summary of the storage stack structure, monitoring commands that may change the structure of the storage stack, and updating the stored summary of the storage stack structure based on any changes caused by the commands.

In one example, a computer-implemented method for storing updated storage stack summaries may include (1) analyzing a storage stack to determine a structure of the storage stack, (2) storing a summary of the structure of the storage stack to a database, (3) intercepting a command directed to the storage stack that causes a change to the structure of the storage stack, and (4) updating only that portion of the summary of the structure in the database that is affected by the change to the structure of the storage stack instead of updating the entire summary.

In some examples, the computer-implemented method may further include using the summary of the structure of the storage stack to create a storage stack snapshot instead of performing an additional analysis of the structure of the storage stack to create the storage stack snapshot. Additionally or alternatively, the computer-implemented method may further include retrieving data from the storage stack by staging a storage stack snapshot based at least in part on the summary of the storage stack.

In some embodiments, intercepting a command directed to the storage stack may include checking the command against a predetermined list of commands that change the structure of the storage stack. In some examples, intercepting a command directed to the storage stack may include using an audit service that monitors commands to detect the command directed to the storage stack.

In one example, the step of analyzing the storage stack to determine the structure of the storage stack is performed as part of a storage stack snapshot operation. In this example, the step of updating only that portion of the summary of the structure in the database that is affected by the change to the structure of the storage stack may not be performed as part of the storage stack snapshot operation.

In some examples, updating only that portion of the summary of the structure in the database that is affected by the change to the structure of the storage stack may include running a discovery operation on the storage stack to determine the new structure of the storage stack. In one embodiment, the summary of the structure of the storage stack may include (1) properties of the storage stack, (2) metadata about the storage stack, (3) information about a file system of the storage stack, and/or (4) information about at least one device within the storage stack.

In one embodiment, a system for implementing the above-described method may include (1) an analysis module, stored in memory, that analyzes a storage stack to determine a structure of the storage stack, (2) a storing module, stored in memory, that stores a summary of the structure of the storage stack to a database, (3) an intercepting module, stored in memory, that intercepts a command directed to the storage stack that causes a change to the structure of the storage stack, (4) an updating module, stored in memory, that updates only that portion of the summary of the structure in the database that is affected by the change to the structure of the storage stack instead of updating the entire summary, and (5) at least one physical processor configured to execute the analysis module, the storing module, the intercepting module, and the updating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) analyze a storage stack to determine a structure of the storage stack, (2) store a summary of the structure of the storage stack to a database, (3) intercept a command directed to the storage stack that causes a change to the structure of the storage stack, and (4) update only that portion of the summary of the structure in the database that is affected by the change to the structure of the storage stack instead of updating the entire summary.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
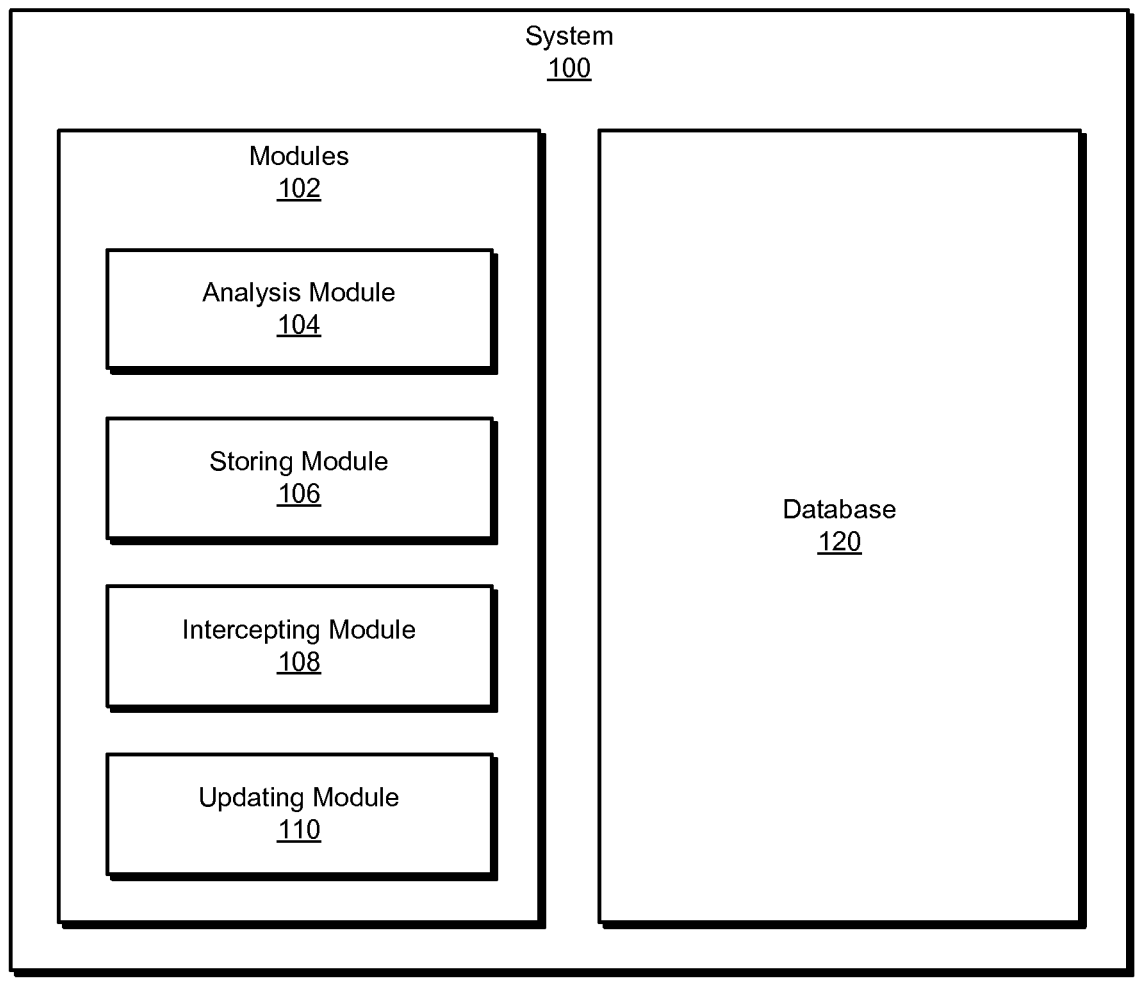
FIG. 1 is a block diagram of an exemplary system for storing updated storage stack summaries.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for storing updated storage stack summaries. As will be explained in greater detail below, by constantly updating a stored summary of a storage stack whenever the storage stack changes, the systems described herein may allow storage stack snapshots to include an accurate and current structure of the storage stack without requiring a snapshot operation to re-analyze the entire structure of the storage stack each and every time. By removing the storage stack structure discovery and analysis steps from storage stack snapshot creation, the systems described herein may allow storage stack snapshots to be created more quickly and efficiently.

Figure 2:
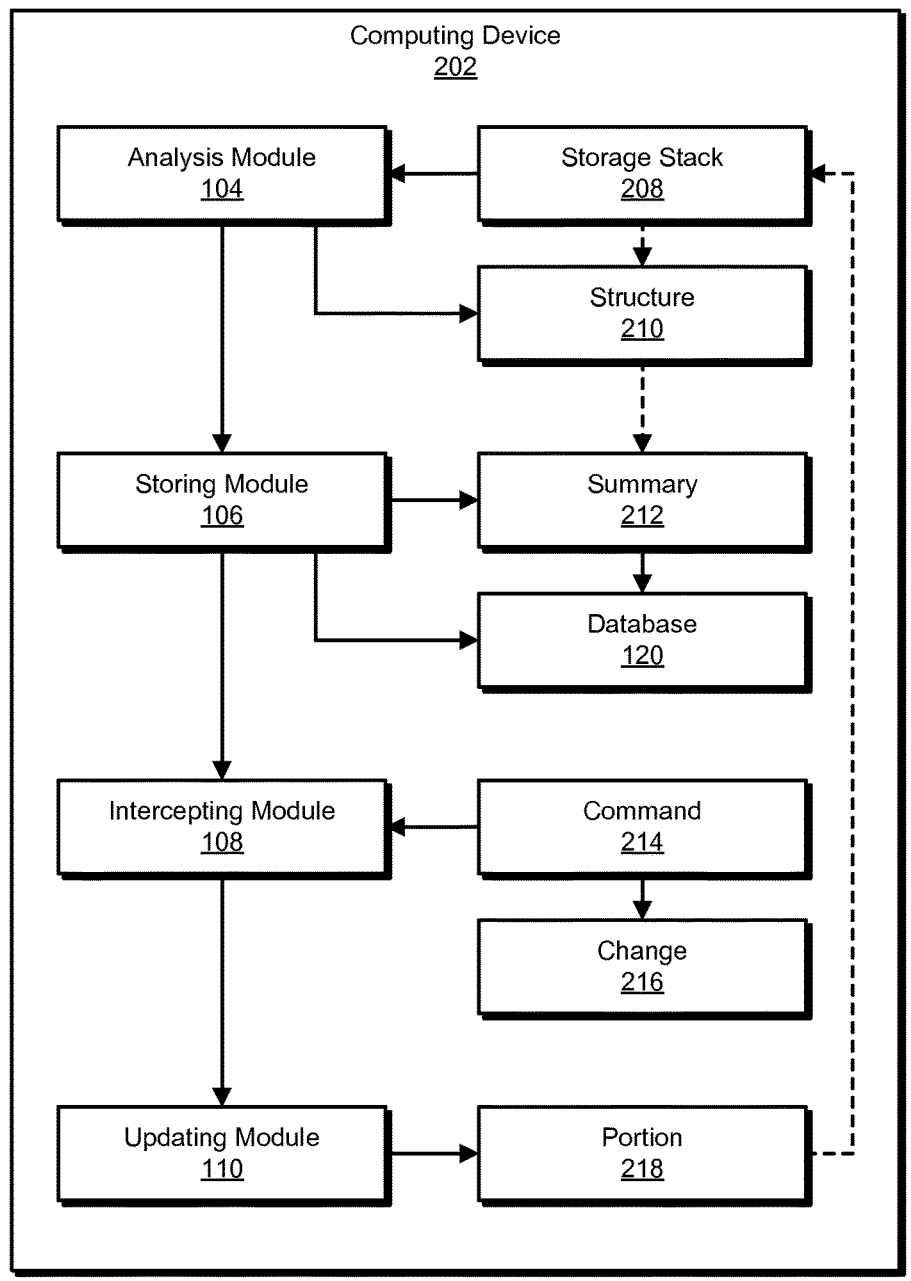
FIG. 2 is a block diagram of an additional exemplary system for storing updated storage stack summaries.
Figure 4:
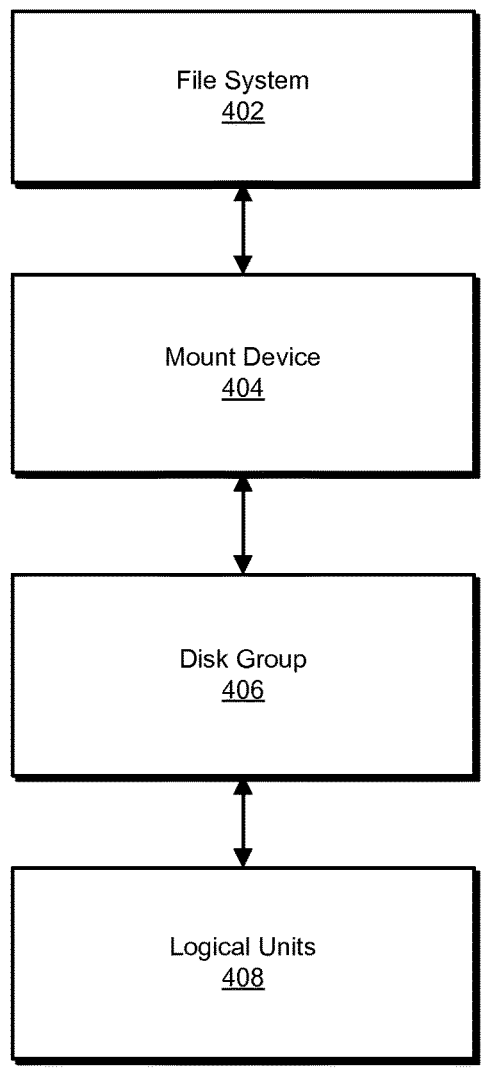
FIG. 4 is a block diagram of an exemplary storage stack.
Figure 5:
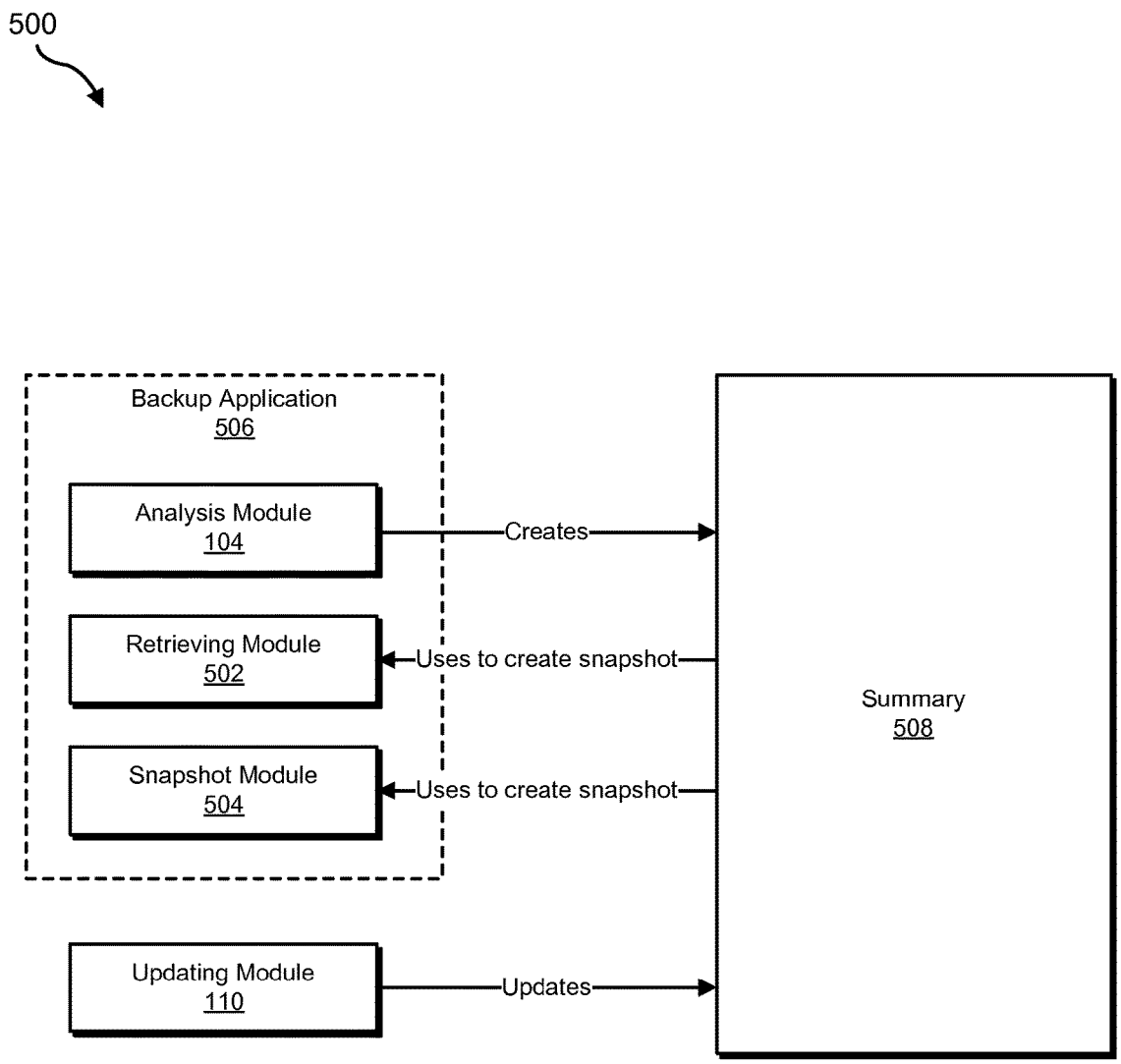
FIG. 5 is a block diagram of an exemplary computing system for storing updated storage stack summaries.

The following will provide, with reference to FIGS. 1, 2, and 5, detailed descriptions of exemplary systems for storing updated storage stack summaries. Detailed descriptions of corresponding computer-implemented methods will also be provided in connection with FIG. 3. Detailed descriptions of an exemplary storage stack will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for storing updated storage stack summaries. As illustrated in this figure, exemplary system 100 may include one or more modules 102 for performing one or more tasks. For example, and as will be explained in greater detail below, exemplary system 100 may include an analysis module 104 that may analyze a storage stack to determine a structure of the storage stack. Exemplary system 100 may additionally include a storing module 106 that may store a summary of the structure of the storage stack to a database. Exemplary system 100 may also include an intercepting module 108 that may intercept a command directed to the storage stack that causes a change to the structure of the storage stack. Exemplary system 100 may additionally include an updating module 110 that may update only that portion of the summary of the structure in the database that may be affected by the change to the structure of the storage stack instead of updating the entire summary.

Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store summaries of storage stack structures.

Database 120 may represent portions of a single database or computing device or a plurality of databases or computing devices. For example, database 120 may represent a portion of computing device 202 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102 and/or may store all or a portion of the data in database 120.

In one embodiment, one or more of modules 102 from FIG. 1 may, when executed by at least one processor of computing device 202, enable computing device 202 to store updated storage stack summaries. For example, and as will be described in greater detail below, analysis module 104 may analyze a storage stack 208 to determine a structure 210 of storage stack 208. Next, storing module 106 may store a summary 212 of structure 210 of storage stack 208 to a database 120. At some later point, intercepting module 108 may intercept a command 214 directed to storage stack 208 that causes a change 216 to structure 210 of storage stack 208. In response, updating module 110 may update only that portion 218 of summary 212 of structure 210 in database 120 that is affected by change 216 to structure 210 of storage stack 208 instead of updating the entire summary 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
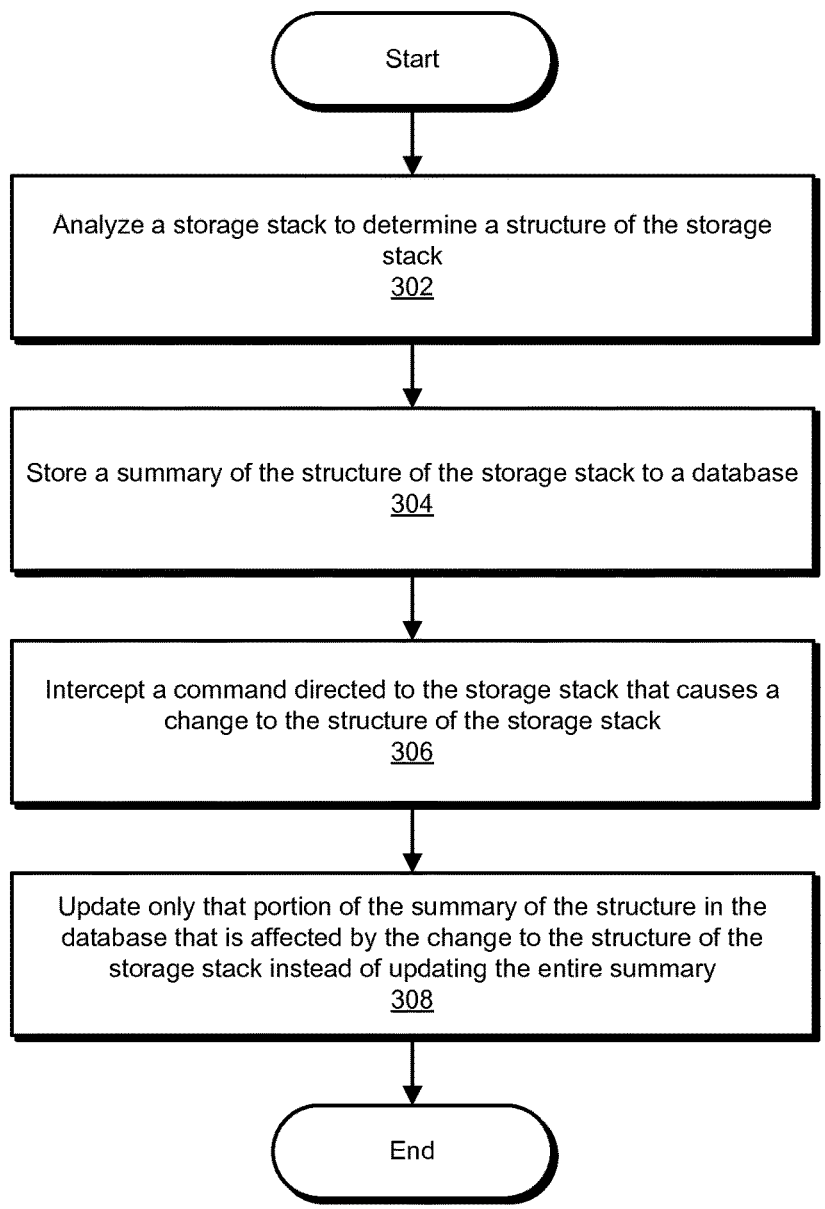
FIG. 3 is a flow diagram of an exemplary method for storing updated storage stack summaries.

FIG. 3 is a flow diagram of an exemplary computer-implemented method 300 for storing updated storage stack summaries. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may analyze a storage stack to determine a structure of the storage stack. For example, analysis module 104 may, as part of computing device 202 in FIG. 2, analyze storage stack 208 to determine a structure 210 of storage stack 208.

The term "storage stack," as used herein, generally refers to any structure that may be used to store data. In some embodiments, a storage stack may include both storage hardware and software designed to facilitate data storage. FIG. 4 is a block diagram of an exemplary storage stack 400. As illustrated in FIG. 4, a storage stack may include, among other items, a file system 402, a mount device 404, a disk group 406, and/or one or more logical units 408. File system 402 may include shared-disk file systems, clustered file systems, disk file systems, and/or distributed file systems. Examples of file system 402 may include EXT3 and/or NETAPP FILER. Examples of mount device 404 may include storage devices of any type, such as hard disks, storage area networks, and/or solid state memory. Examples of disk group 406 may include groupings of any types of storage structure, including basic disks, dynamic disks, and/or logical units of any type. Examples of logical units 408 may include any type of physical and/or virtual storage device, such as network file system volumes and/or logical volume management volumes.

The term "structure," as used herein, generally refers to any description of the components of a storage stack, the connections between components of a storage stack, the properties of a storage stack, and/or the properties of components of a storage stack. In one example, a structure of a storage stack may include a map of components of a storage stack showing how those components are connected. In another example, a structure may include a list of each component in a storage stack along with the properties of that component and/or any connections between that component and other components.

Analysis module 104 may analyze the storage stack to determine the structure of the storage stack in a variety of ways and/or contexts. For example, analysis module 104 may run a discovery operation on the storage stack in order to determine the structure of the storage stack. In some embodiments, analysis module 104 may be part of a storage stack snapshot application configured to analyze the structure of storage stacks as part of creating storage stack snapshots. In other embodiments, analysis module 104 may be part of an independent application not configured to create complete storage stack snapshots.

At step 304, one or more of the systems described herein may store a summary of the structure of the storage stack to a database. For example, storing module 106 may, as part of computing device 202 in FIG. 2, store summary 212 of structure 210 of storage stack 208 to database 120.

Storing module 106 may store the summary in a variety of ways and/or contexts. For example, storing module 106 may store the summary in an SQLITE database. In some embodiments, storing module 106 may be part of a backup application. Additionally or alternatively, storing module 106 may be part of a wrapper around a backup application and/or a helper application for a backup application.

The term "summary," as used herein, generally refers to any stored description of a structure of a storage stack. In some embodiments, a summary may be stored as a structured query language (SQL) schema in a database. In one embodiment, the summary of the structure of the storage stack may include properties of the storage stack, metadata about the storage stack, information about a file system of the storage stack, and/or information about at least one device within the storage stack. For example, a summary might include fields such as host, backup selection, disk group, and/or logical unit number.

At step 306, one or more of the systems described herein may intercept a command directed to the storage stack that causes a change to the structure of the storage stack. For example, intercepting module 108 may, as part of computing device 202 in FIG. 2, intercept command 214 directed to storage stack 208 that causes change 216 to structure 210 of storage stack 208.

The term "command," as used herein, generally refers to any message indicating a change of state or potential change of state of a storage stack structure. In some embodiments, a command may include a message sent by a command line interface, a message announcing the presence of a new device as part of the storage stack, and/or a system call triggered by an application. Examples of commands may include, without limitation, mount, umount, lvextend, and/or vgextend.

Intercepting module 108 may intercept the command in a variety of ways and/or contexts. In some embodiments, intercepting module 108 may be part of a backup application. In other embodiments, intercepting module 108 may be part of a wrapper for a backup application and/or helper application for a backup application. Additionally or alternatively, intercepting module 108 may include a kernel module.

In some examples, intercepting module 108 may intercept the command directed to the storage stack by checking the command against a predetermined list of commands that change the structure of the storage stack. In some embodiments, the list of commands may be dependent on a type of file system and/or operating system being used. In some examples, the list of commands may be stored in a database, such as an SQLITE database. In some embodiments, the commands may be stored in a trie data structure. In some examples, the list of commands may also include a list of parameters of the commands that may alter whether or not a given command affects the structure of a storage stack.

In some examples, intercepting module 108 may intercept a command directed to the storage stack by using an audit service that monitors commands to detect the command directed to the storage stack. In some embodiments, an audit service may be separate from a backup application that may include some portion of the systems described herein. In some embodiments, intercepting module 108 may use multiple audit services that monitor different sources of commands, such as command line interfaces and/or applications.

In some examples, intercepting module 108 may only intercept commands that alter certain portions of the structure of a storage stack, such as the file system and/or mount point. Additionally or alternatively, intercepting module 108 may include a list of protected storage stacks and may only intercept commands affecting those storage stacks, ignoring commands that may affect other storage stacks that may be part of the computing environment.

In some embodiments, intercepting module 108 may monitor applications and/or command line interfaces that sent a command that may cause a stack change for a period of time after the command in order to determine of additional stack altering commands are forthcoming. In some examples, intercepting module 108 may continue to monitor a source of a command for a predefined time period before and/or in addition to forwarding the command to other systems described herein.

In some embodiments, intercepting module 108 may mark the current structure of the storage stack as stale upon intercepting a command and/or may halt all operations that are currently taking place that are based on the current structure of the storage stack. In some examples, storage stack changes may take place during operations based on the current structure of the storage stack and marking the structure stale upon intercepting a command may prevent operations from using a less current version of the structure of the storage stack.

At step 308, one or more of the systems described herein may update only that portion of the summary of the structure in the database that is affected by the change to the structure of the storage stack instead of updating the entire summary. For example, updating module 110 may, as part of computing device 202 in FIG. 2, update only that portion 218 of summary 212 of structure 210 in database 120 that is affected by change 216 to structure 210 of storage stack 208 instead of updating the entire summary 212.

Updating module 110 may update the identified portion of the summary of the structure in a variety of ways and/or contexts. For example, updating module 110 may determine what part of the structure a change affects and may then update that portion of the summary structure.

In some examples, updating module 110 may update only that portion of the summary of the structure in the database that is affected by the change to the structure of the storage stack by running a discovery operation on the storage stack to determine the new structure of the storage stack. For example, a change may add another logical unit to a storage stack. In this example, updating module 110 may run a discovery operation to determine the properties of the new logical unit.

In some examples, the summary of the structure of the storage stack may be used to construct a storage stack snapshot. The term "snapshot," as used herein, generally refers to any description of a state of a storage stack. A storage stack snapshot may include a structure of the storage stack, some or all of the data stored within a storage stack, and/or properties of a storage stack. In some embodiments, a storage stack snapshot may be created and/or stored by a backup application.

In one embodiment, the step of analysis module 104 analyzing the storage stack to determine the structure of the storage stack may be performed as part of a storage stack snapshot operation and the step of updating module 110 updating only that portion of the summary of the structure in the database that is affected by the change to the structure of the storage stack may not be performed as part of the storage stack snapshot operation. For example, analysis module 104 may be part of a backup application that may create a storage stack snapshot that includes the structure of the storage stack. In this example, updating module 110 may not be part of the backup application and/or may update the summary of the storage stack at a later time after the completion of the storage stack snapshot.

The systems described herein may interact with a storage stack summary in a variety of ways. FIG. 5 is a block diagram of an exemplary system 500 for storing updated storage stack summaries. As illustrated in FIG. 5, analysis module 104 may create a summary 508. Retrieving module 502 and/or snapshot module 504 may then use summary 508 to create a snapshot. Updating module 110 may update summary 508. In some examples, analysis module 104, retrieving module 502, and/or snapshot module 504 may be part of a backup application 506.

As illustrated in FIG. 5, snapshot module 502 may use summary 508 of the structure of the storage stack to create a storage stack snapshot instead of performing an additional analysis of the structure of the storage stack to create the storage stack snapshot. For example, analysis module 104 may have created summary 508 as part of an initial snapshot creation operation for backup application 506. Backup application 506 may later run another snapshot creation operation that may also involve a summary. In this example, snapshot module 502 may supply summary 508 to the snapshot operation rather than creating an additional summary.

In some examples, retrieving module 504 may retrieve data from the storage stack by staging a storage stack snapshot based at least in part on summary 508. In some examples, retrieving module 504 may stage a storage stack snapshot on additional hardware that is not part of the original storage stack and may use summary 508 to determine the setup of this additional hardware.

As described in connection with method 300 above, the systems described herein may speed up storage stack snapshot creation by creating a summary of the structure of a storage stack and updating the summary whenever the storage stack structure changes. In some examples, the systems described herein may keep the summary updated by using an audit service to monitor commands that may affect the structure of a storage stack and/or applying any changes caused by commands to a stored summary of the structure. By storing an updated summary of a storage stack structure, the systems described herein may allow snapshots skip the steps of discovering and/or analyzing the storage stack structure and thus may allow the snapshot creation operations use fewer resources, improving efficiency and possibly increasing the frequency with which snapshots may be created, leading to improved data backup capabilities.

Figure 6:
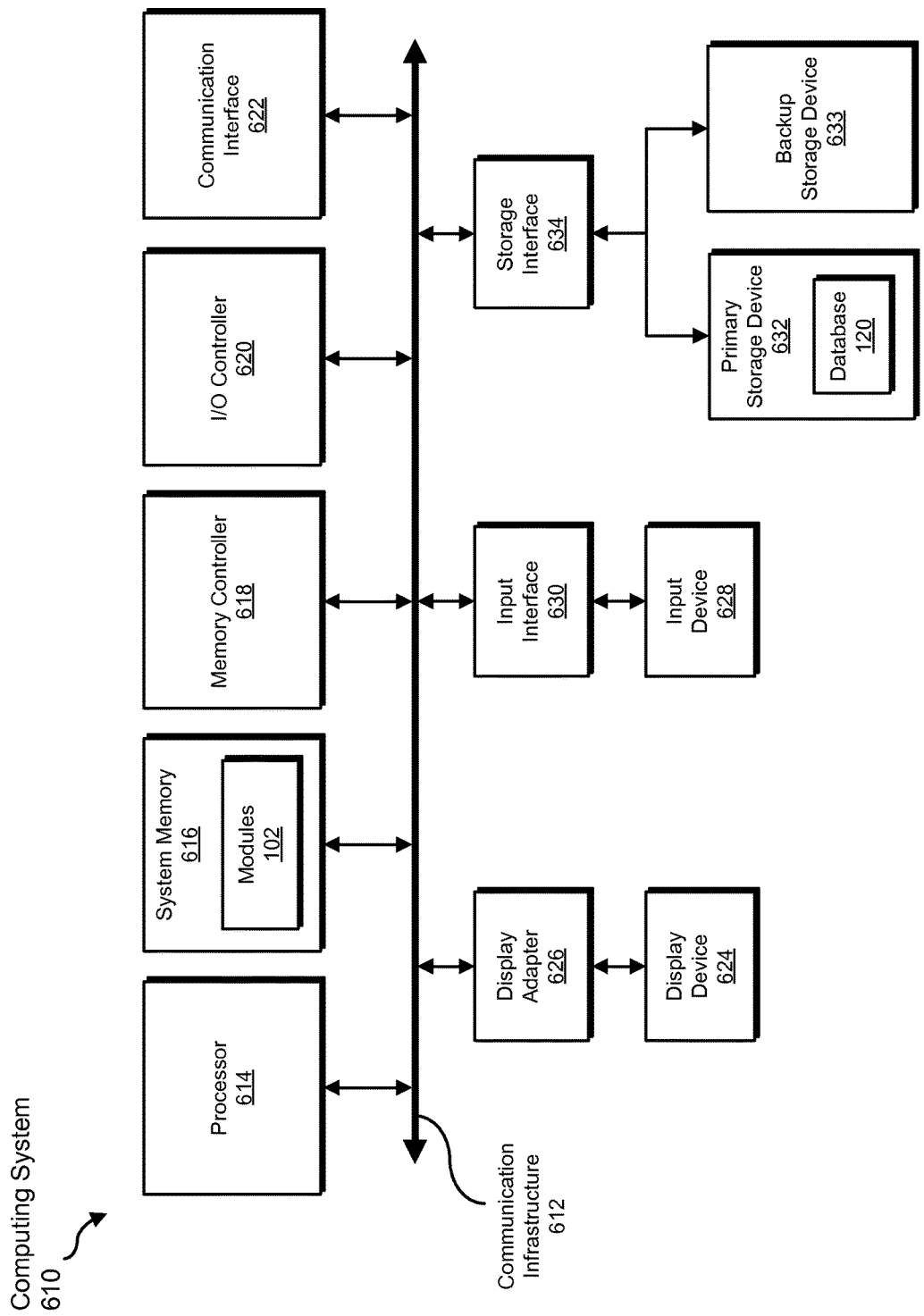
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
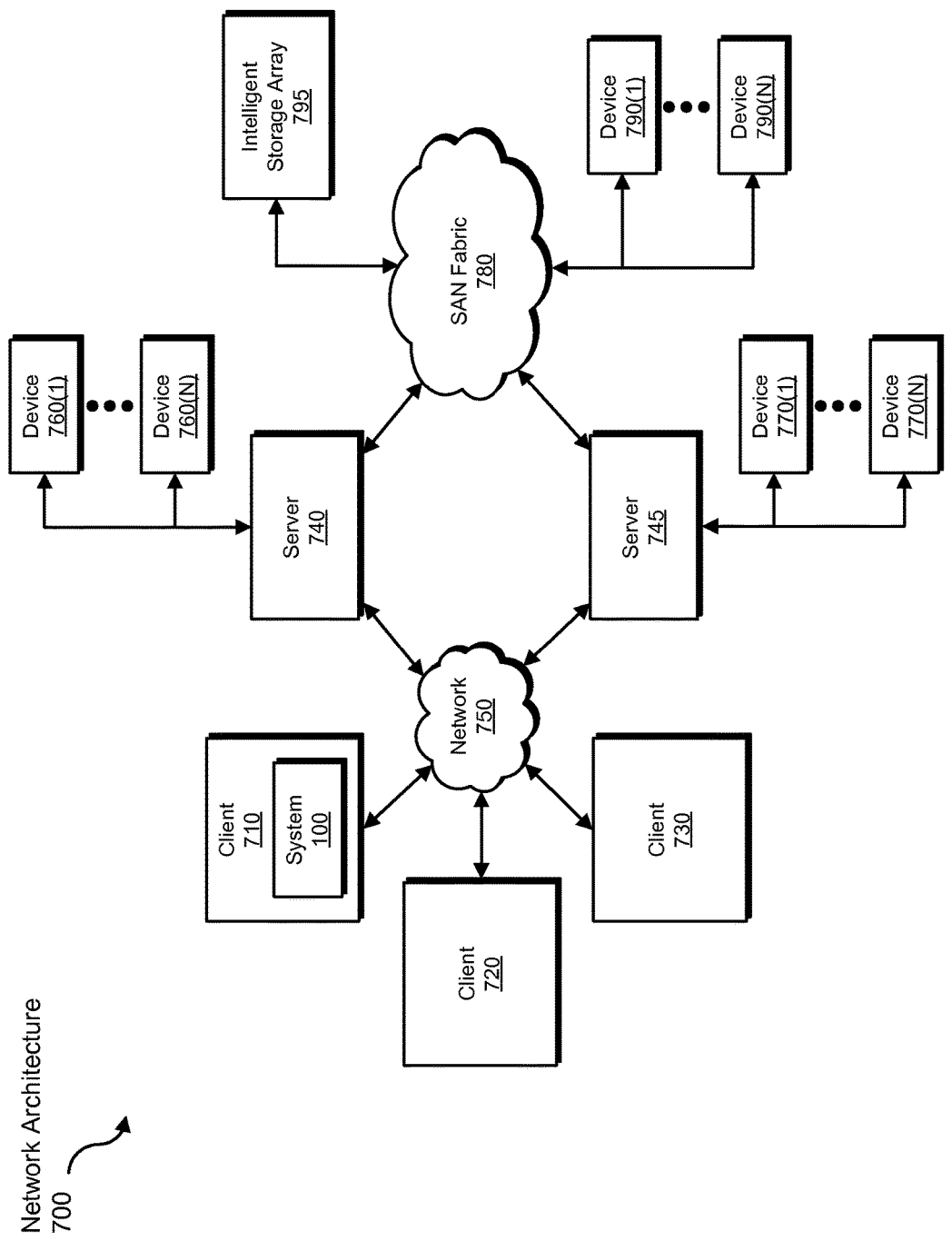
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for storing updated storage stack summaries.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive storage stack structure data to be transformed, transform the storage stack structure data, output a result of the transformation to a database, use the result of the transformation to generate a summary of the storage stack structure, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for storing updated storage stack summaries, at least a portion of the method being performed by a computing device comprising at least one processor, the method comprising:
   analyzing, as part of a storage stack snapshot operation, a storage stack to determine a structure of the storage stack, wherein the storage stack snapshot operation reduces computing device resources involved in determining the structure of the storage stack;
   storing a summary of the structure of the storage stack to a database;
   intercepting a command directed to the storage stack that causes a change to the structure of the storage stack;
   updating only that portion of the summary of the structure in the database that is affected by the change to the structure of the storage stack instead of updating the entire summary, wherein the step of updating only that portion of the summary of the structure in the database that is affected by the change to the structure of the storage stack is not performed as part of the storage stack snapshot operation thereby speeding up storage stack snapshot creation by skipping one or more operations associated with discovering the storage stack structure.

2. The computer-implemented method of claim 1, further comprising retrieving data from the storage stack by staging a storage stack snapshot based at least in part on the summary of the storage stack.

3. The computer-implemented method of claim 1, wherein intercepting the command directed to the storage stack comprises checking the command against a predetermined list of commands that change the structure of the storage stack.

4. The computer-implemented method of claim 1, further comprising using the summary of the structure of the storage stack to create a storage stack snapshot instead of performing an additional analysis of the structure of the storage stack to create the storage stack snapshot.

5. The computer-implemented method of claim 1, wherein updating only that portion of the summary of the structure in the database that is affected by the change to the structure of the storage stack comprises running a discovery operation on the storage stack to determine the new structure of the storage stack.

6. The computer-implemented method of claim 1, wherein intercepting the command directed to the storage stack comprises using an audit service that monitors commands to detect the command directed to the storage stack.

7. The computer-implemented method of claim 1, wherein the summary of the structure of the storage stack includes at least one of:
   properties of the storage stack;
   metadata about the storage stack;
   information about a file system of the storage stack;
   information about at least one device within the storage stack.

8. A system for storing updated storage stack summaries, the system comprising:
   an analysis module, stored in memory, that analyzes, as part of a storage stack snapshot operation, a storage stack to determine a structure of the storage stack, wherein the storage stack snapshot operation reduces computing device resources involved in determining the structure of the storage stack;
   a storing module, stored in memory, that stores a summary of the structure of the storage stack to a database;
   an intercepting module, stored in memory, that intercepts a command directed to the storage stack that causes a change to the structure of the storage stack;
   an updating module, stored in memory, that updates only that portion of the summary of the structure in the database that is affected by the change to the structure of the storage stack instead of updating the entire summary, wherein the step of updating only that portion of the summary of the structure in the database that is affected by the change to the structure of the storage stack is not performed as part of the storage stack snapshot operation thereby speeding up storage stack snapshot creation by skipping one or more operations associated with discovering the storage stack structure;
   at least one physical processor configured to execute the analysis module, the storing module, the intercepting module, and the updating module.

9. The system of claim 8, further comprising a retrieving module, stored in memory, that retrieves data from the storage stack by staging a storage stack snapshot based at least in part on the summary of the storage stack.

10. The system of claim 8, wherein the intercepting module intercepts the command directed to the storage stack by checking the command against a predetermined list of commands that change the structure of the storage stack.

11. The system of claim 8, further comprising a snapshot module, stored in memory, that uses the summary of the structure of the storage stack to create a storage stack snapshot instead of performing an additional analysis of the structure of the storage stack to create the storage stack snapshot.

12. The system of claim 8, wherein the updating module updates only that portion of the summary of the structure in the database that is affected by the change to the structure of the storage stack by running a discovery operation on the storage stack to determine the new structure of the storage stack.

13. The system of claim 8, wherein the intercepting module intercepts a command directed to the storage stack by using an audit service that monitors commands to detect the command directed to the storage stack.

14. The system of claim 8, wherein the summary of the structure of the storage stack includes at least one of:
- properties of the storage stack;
- metadata about the storage stack;
- information about a file system of the storage stack;
- information about at least one device within the storage stack.

15. A non-transitory computer-readable medium comprising one or more computer-readable instructions that, when executed by at least one processor of a computing device, cause the computing device to:
- analyze, as part of a storage stack snapshot operation, a storage stack to determine a structure of the storage stack, wherein the storage stack snapshot operation reduces computing device resources involved in determining the structure of the storage stack;
- store a summary of the structure of the storage stack to a database;
- intercept a command directed to the storage stack that causes a change to the structure of the storage stack;
- update only that portion of the summary of the structure in the database that is affected by the change to the structure of the storage stack instead of updating the entire summary, wherein the step of updating only that portion of the summary of the structure in the database that is affected by the change to the structure of the storage stack is not performed as part of the storage stack snapshot operation thereby speeding up storage stack snapshot creation by skipping one or more operations associated with discovering the storage stack structure.

16. The non-transitory computer-readable medium of claim 15, wherein the one or more computer-readable instructions cause the computing device to retrieve data from the storage stack by staging a storage stack snapshot based at least in part on the summary of the storage stack.

17. The non-transitory computer-readable medium of claim 15, wherein the one or more computer-readable instructions cause the computing device to intercept the command directed to the storage stack by checking the command against a predetermined list of commands that change the structure of the storage stack.

* * * * *